(12) United States Patent
Sah et al.

(10) Patent No.: US 9,140,337 B2
(45) Date of Patent: Sep. 22, 2015

(54) METHOD FOR MODEL BASED CLUTCH CONTROL AND TORQUE ESTIMATION

(75) Inventors: Jy-Jen F. Sah, West Bloomfield, MI (US); Bryan R. Snyder, Healdsburg, CA (US); Ali K Naqvi, White Lake, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1708 days.

(21) Appl. No.: 12/251,416

(22) Filed: Oct. 14, 2008

(65) Prior Publication Data

US 2009/0105039 A1    Apr. 23, 2009

Related U.S. Application Data

(60) Provisional application No. 60/981,893, filed on Oct. 23, 2007.

(51) Int. Cl.

| | |
|---|---|
| *F16D 48/06* | (2006.01) |
| *F16H 61/06* | (2006.01) |
| *B60K 6/44* | (2007.10) |
| *B60K 6/365* | (2007.10) |
| *B60W 10/115* | (2012.01) |

(Continued)

(52) U.S. Cl.
CPC .............. *F16H 3/728* (2013.01); *B60K 6/365* (2013.01); *B60K 6/445* (2013.01); *B60K 6/547* (2013.01); *B60W 10/02* (2013.01); *B60W 10/06* (2013.01); *B60W 10/08* (2013.01); *B60W 10/115* (2013.01); *B60W 10/30* (2013.01); *B60W 20/00* (2013.01); *F16D 48/066* (2013.01); *F16H 61/061* (2013.01); *B60K 1/02* (2013.01); *B60L 2240/423* (2013.01); *B60L 2240/441* (2013.01); *B60L 2240/443* (2013.01); *B60L 2240/445* (2013.01); *B60L 2240/485* (2013.01); *B60W 2510/0638* (2013.01); *B60W 2510/0657* (2013.01); *B60W 2510/0671* (2013.01); *B60W 2510/0676* (2013.01); *B60W 2510/107* (2013.01); *B60W 2510/246* (2013.01); *B60W 2540/10* (2013.01); *B60W 2540/12* (2013.01); *B60W 2550/12* (2013.01); *B60W 2710/0605* (2013.01); *B60W 2710/0616* (2013.01); *B60W 2710/0666* (2013.01); *B60W 2710/083* (2013.01); *F16D 2500/50251* (2013.01); *F16H 2037/0866* (2013.01); *F16H 2037/102* (2013.01); *F16H 2037/104* (2013.01); *F16H 2037/106* (2013.01); *F16H 2061/062* (2013.01); *Y02T 10/6239* (2013.01); *Y02T 10/6286* (2013.01); *Y02T 10/642* (2013.01); *Y10T 477/26* (2015.01)

(58) Field of Classification Search
None
See application file for complete search history.

(56) References Cited

U.S. PATENT DOCUMENTS

| | | | | |
|---|---|---|---|---|
| 4,707,789 A | * | 11/1987 | Downs et al. | 701/58 |
| 4,942,787 A | * | 7/1990 | Aoki et al. | 477/152 |

(Continued)

*Primary Examiner* — Terry Chau

(57) ABSTRACT

A method for operating a powertrain through selective application of a hydraulically actuated clutch includes monitoring a state of a pressure control switch operatively coupled the clutch, monitoring a hydraulic line pressure utilized by the pressure control switch to fill the clutch, determining a hydraulic flow rate flowing to the clutch based upon the state of the pressure control switch and the hydraulic line pressure, tracking a clutch fill volume of the clutch based upon the hydraulic flow rate, and controlling operation of the clutch based upon the clutch fill volume.

8 Claims, 7 Drawing Sheets

(51) Int. Cl.
*F16H 3/72* (2006.01)
*B60K 6/445* (2007.10)
*B60K 6/547* (2007.10)
*B60W 10/02* (2006.01)
*B60W 10/06* (2006.01)
*B60W 10/08* (2006.01)
*B60W 10/30* (2006.01)
*B60W 20/00* (2006.01)
*B60K 1/02* (2006.01)
*F16H 37/08* (2006.01)
*F16H 37/10* (2006.01)

(56) References Cited

U.S. PATENT DOCUMENTS

| | | | | |
|---|---|---|---|---|
| 5,054,599 | A * | 10/1991 | Marcott | 192/85.63 |
| 5,216,606 | A * | 6/1993 | Lentz et al. | 701/66 |
| 5,343,994 | A * | 9/1994 | Kyrtsos | 192/85.63 |
| 5,551,930 | A | 9/1996 | Creger et al. | 477/130 |
| 5,853,076 | A * | 12/1998 | McKee et al. | 192/85.63 |
| 6,148,982 | A * | 11/2000 | Sen | 192/85.63 |
| 6,216,074 | B1 * | 4/2001 | Hillman et al. | 701/51 |
| 6,285,942 | B1 * | 9/2001 | Steinmetz et al. | 701/67 |
| 6,470,763 | B2 * | 10/2002 | Ohashi et al. | 74/335 |
| 6,640,950 | B2 * | 11/2003 | Harvey et al. | 192/85.01 |
| 6,832,148 | B1 | 12/2004 | Bennett | |
| 6,868,318 | B1 | 3/2005 | Cawthorne | |
| 7,154,236 | B1 | 12/2006 | Heap | |
| 7,159,506 | B2 * | 1/2007 | Tokura et al. | 91/433 |
| 8,062,174 | B2 * | 11/2011 | Sah et al. | 477/15 |
| 2004/0178041 | A1 * | 9/2004 | Kraxner et al. | 192/87.19 |
| 2005/0076958 | A1 | 4/2005 | Foster | |
| 2005/0077867 | A1 | 4/2005 | Cawthorne | |
| 2005/0077877 | A1 | 4/2005 | Cawthorne | |
| 2005/0080523 | A1 | 4/2005 | Bennett | |
| 2005/0080527 | A1 | 4/2005 | Tao | |
| 2005/0080535 | A1 | 4/2005 | Steinmetz | |
| 2005/0080537 | A1 | 4/2005 | Cawthorne | |
| 2005/0080538 | A1 | 4/2005 | Hubbard | |
| 2005/0080539 | A1 | 4/2005 | Hubbard | |
| 2005/0080540 | A1 | 4/2005 | Steinmetz | |
| 2005/0080541 | A1 | 4/2005 | Sah | |
| 2005/0182526 | A1 | 8/2005 | Hubbard | |
| 2005/0182543 | A1 | 8/2005 | Sah | |
| 2005/0182546 | A1 | 8/2005 | Hsieh | |
| 2005/0182547 | A1 | 8/2005 | Sah | |
| 2005/0189918 | A1 | 9/2005 | Weisgerber | |
| 2005/0252283 | A1 | 11/2005 | Heap | |
| 2005/0252305 | A1 | 11/2005 | Hubbard | |
| 2005/0252474 | A1 | 11/2005 | Sah | |
| 2005/0255963 | A1 | 11/2005 | Hsieh | |
| 2005/0255964 | A1 | 11/2005 | Heap | |
| 2005/0255965 | A1 | 11/2005 | Tao | |
| 2005/0255966 | A1 | 11/2005 | Tao | |
| 2005/0255967 | A1 | 11/2005 | Foster | |
| 2005/0255968 | A1 | 11/2005 | Sah | |
| 2005/0256617 | A1 | 11/2005 | Cawthorne | |
| 2005/0256618 | A1 | 11/2005 | Hsieh | |
| 2005/0256623 | A1 | 11/2005 | Hubbard | |
| 2005/0256625 | A1 | 11/2005 | Sah | |
| 2005/0256626 | A1 | 11/2005 | Hsieh | |
| 2005/0256627 | A1 | 11/2005 | Sah | |
| 2005/0256629 | A1 | 11/2005 | Tao | |
| 2005/0256631 | A1 | 11/2005 | Cawthorne | |
| 2005/0256633 | A1 | 11/2005 | Heap | |
| 2005/0256919 | A1 | 11/2005 | Cawthorne | |
| 2006/0194670 | A1 | 8/2006 | Heap | |
| 2007/0078580 | A1 | 4/2007 | Cawthorne | |
| 2007/0093953 | A1 | 4/2007 | Heap | |
| 2007/0149348 | A1 | 6/2007 | Holmes | |
| 2007/0191181 | A1 | 8/2007 | Burns | |
| 2007/0225886 | A1 | 9/2007 | Morris | |
| 2007/0225887 | A1 | 9/2007 | Morris | |
| 2007/0225888 | A1 | 9/2007 | Morris | |
| 2007/0225889 | A1 | 9/2007 | Morris | |
| 2007/0260381 | A1 | 11/2007 | Sah | |
| 2007/0276569 | A1 | 11/2007 | Sah | |
| 2007/0284162 | A1 | 12/2007 | Zettel | |
| 2007/0284163 | A1 | 12/2007 | Heap | |
| 2007/0284176 | A1 | 12/2007 | Sah | |
| 2007/0285059 | A1 | 12/2007 | Zettel | |
| 2007/0285060 | A1 | 12/2007 | Zettel | |
| 2007/0285061 | A1 | 12/2007 | Zettel | |
| 2007/0285063 | A1 | 12/2007 | Zettel | |
| 2007/0285097 | A1 | 12/2007 | Zettel | |
| 2008/0004779 | A1 | 1/2008 | Sah | |
| 2008/0028879 | A1 | 2/2008 | Robinette | |
| 2008/0032855 | A1 | 2/2008 | Sah | |
| 2008/0060717 | A1 * | 3/2008 | Dourra et al. | 141/95 |
| 2008/0064559 | A1 | 3/2008 | Cawthorne | |
| 2008/0064562 | A1 | 3/2008 | Zettel | |
| 2008/0103003 | A1 | 5/2008 | Sah | |
| 2008/0119320 | A1 | 5/2008 | Wu | |
| 2008/0119321 | A1 | 5/2008 | Heap | |
| 2008/0120000 | A1 | 5/2008 | Heap | |
| 2008/0120001 | A1 | 5/2008 | Heap | |
| 2008/0120002 | A1 | 5/2008 | Heap | |
| 2008/0176706 | A1 | 7/2008 | Wu | |
| 2008/0176709 | A1 | 7/2008 | Wu | |
| 2008/0181280 | A1 | 7/2008 | Wang | |
| 2008/0182696 | A1 | 7/2008 | Sah | |
| 2008/0183372 | A1 | 7/2008 | Snyder | |
| 2008/0234097 | A1 | 9/2008 | Sah | |
| 2008/0236921 | A1 | 10/2008 | Huseman | |
| 2008/0243346 | A1 | 10/2008 | Huseman | |
| 2008/0249745 | A1 | 10/2008 | Heap | |
| 2008/0262694 | A1 | 10/2008 | Heap | |
| 2008/0262698 | A1 | 10/2008 | Lahti | |
| 2008/0272717 | A1 | 11/2008 | Gleason | |
| 2008/0275611 | A1 | 11/2008 | Snyder | |
| 2008/0275624 | A1 | 11/2008 | Snyder | |
| 2008/0275625 | A1 | 11/2008 | Snyder | |
| 2008/0287255 | A1 | 11/2008 | Snyder | |
| 2009/0069148 | A1 | 3/2009 | Heap | |
| 2009/0069989 | A1 | 3/2009 | Heap | |
| 2009/0070019 | A1 | 3/2009 | Heap | |
| 2009/0082170 | A1 | 3/2009 | Heap | |
| 2009/0088294 | A1 | 4/2009 | West | |
| 2009/0105896 | A1 | 4/2009 | Tamai | |
| 2009/0105898 | A1 | 4/2009 | Wu | |
| 2009/0105914 | A1 | 4/2009 | Buur | |
| 2009/0107745 | A1 | 4/2009 | Buur | |
| 2009/0107755 | A1 | 4/2009 | Kothari | |
| 2009/0108673 | A1 | 4/2009 | Wang | |
| 2009/0111637 | A1 | 4/2009 | Day | |
| 2009/0111640 | A1 | 4/2009 | Buur | |
| 2009/0111642 | A1 | 4/2009 | Sah | |
| 2009/0111643 | A1 | 4/2009 | Sah | |
| 2009/0111644 | A1 | 4/2009 | Kaminsky | |
| 2009/0111645 | A1 | 4/2009 | Heap | |
| 2009/0112385 | A1 | 4/2009 | Heap | |
| 2009/0112392 | A1 | 4/2009 | Buur | |
| 2009/0112399 | A1 | 4/2009 | Buur | |
| 2009/0112412 | A1 | 4/2009 | Cawthorne | |
| 2009/0112416 | A1 | 4/2009 | Heap | |
| 2009/0112417 | A1 | 4/2009 | Kaminsky | |
| 2009/0112418 | A1 | 4/2009 | Buur | |
| 2009/0112419 | A1 | 4/2009 | Heap | |
| 2009/0112420 | A1 | 4/2009 | Buur | |
| 2009/0112421 | A1 | 4/2009 | Sah | |
| 2009/0112422 | A1 | 4/2009 | Sah | |
| 2009/0112423 | A1 | 4/2009 | Foster | |
| 2009/0112427 | A1 | 4/2009 | Heap | |
| 2009/0112428 | A1 | 4/2009 | Sah | |
| 2009/0112429 | A1 | 4/2009 | Sah | |
| 2009/0112495 | A1 | 4/2009 | Center | |
| 2009/0115349 | A1 | 5/2009 | Heap | |
| 2009/0115350 | A1 | 5/2009 | Heap | |
| 2009/0115351 | A1 | 5/2009 | Heap | |
| 2009/0115352 | A1 | 5/2009 | Heap | |
| 2009/0115353 | A1 | 5/2009 | Heap | |
| 2009/0115354 | A1 | 5/2009 | Heap | |
| 2009/0115365 | A1 | 5/2009 | Heap | |

(56) References Cited

U.S. PATENT DOCUMENTS

| | | |
|---|---|---|
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

* cited by examiner

METHOD FOR MODEL BASED CLUTCH CONTROL AND TORQUE ESTIMATION

CROSS REFERENCE TO RELATED APPLICATIONS

This application claims the benefit of U.S. Provisional Application No. 60/981,893, filed on Oct. 23, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic oil for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying the hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can transmit before the clutch slips. This disclosure is primarily focused upon clutches designed for synchronous shifts, wherein a clutch torque capacity is maintained in excess of a clutch reactive torque in order to substantially eliminate slip.

The hydraulic control system, as described above, utilizes lines charged with hydraulic oil to selectively activate clutches within the transmission. Hydraulic switches or pressure control switches (PCS) are used to selectively apply pressure within a hydraulic control system. A PCS can be electrically controlled, for instance with a magnetically actuated solenoid device, well known in the art. Alternatively, a PCS can be hydraulically controlled, for example, actuated by a command pressure and a return spring. Features within the PCS selectively channel or block hydraulic oil from passing therethrough depending upon the actuation state of the PCS. In a blocked state, a PCS is known to include an exhaust path, allowing any trapped hydraulic oil to escape, thereby de-energizing the connected hydraulic circuit in order to complete the actuation cycle.

A hydraulically actuated clutch operates by receiving pressurized hydraulic oil into a clutch volume chamber. Hydraulic oil in this clutch volume chamber exerts pressure upon features within the volume chamber. A piston or similar structure is known to be utilized to transform this hydraulic pressure into an articulation, for example a translating motion or compressing force. In an exemplary hydraulically actuated clutch, pressurized hydraulic oil is used to fill a clutch volume chamber and thereby displace a clutch piston in order to selectively apply a compression force to the connective surfaces of the clutch. A restoring force, for example as provided by a return spring, is known to be used to counter the compressive force of the hydraulic oil. As described above, clutches are known to be engaged through a range of engagement states. An exemplary clutch with all hydraulic pressure removed can be in an unlocked state. An exemplary clutch with maximum hydraulic pressure can be in a locked state. An exemplary clutch with some partial hydraulic force applied, wherein the force of the hydraulic oil and the force of a return spring are substantially equal, the clutch can be in a touching state, with the plates in contact but with little or no clamping force applied.

An engagement of a clutch, accomplished through a clutch fill event, is known to be accomplished as rapidly as possible, with some minimum hydraulic pressure being maintained to assure rapid flow of the hydraulic oil into the clutch volume. However, rapid engagement of a clutch can cause a perceptible bump in the vehicle and cause shortened life of the component involved. A shock absorbing device can be utilized to dampen the force of the rapid fill of the clutch volume chamber upon the clutch. For example, a wave plate including a spring feature can be used between the cylinder piston and the clutch to absorb rapid increases in hydraulic pressure.

Operation and control of a clutch requires a method to estimate clutch state and clutch capacity. Known methods include look-up tables factoring different variables and estimating clutch state based upon the look-up tables. A method for real-time clutch state estimation and control based upon an estimated hydraulic flow rate to the clutch would be beneficial.

SUMMARY

A method for operating a powertrain including an electro-mechanical transmission mechanically-operatively coupled to an internal combustion engine and an electric machine adapted to selectively transmit mechanical power to an output member through selective application of a plurality of hydraulically actuated clutches includes monitoring a state of a pressure control switch operatively coupled to one of the clutches, monitoring a hydraulic line pressure utilized by the pressure control switch to fill the clutch, determining a hydraulic flow rate flowing to the clutch based upon the state of the pressure control switch and the hydraulic line pressure, tracking a clutch fill volume of the clutch based upon the hydraulic flow rate, and controlling operation of the clutch based upon the clutch fill volume.

BRIEF DESCRIPTION OF THE DRAWINGS

One or more embodiments will now be described, by way of example, with reference to the accompanying drawings, in which:

FIG. 4 schematically illustrates a model of factors impacting hydraulic flow in an exemplary hydraulic control system, in accordance with the present disclosure;

FIG. 7 graphically depicts a binary pressure switch reading through a time span, including a comparison to a $T_{MIN}$ to $T_{MAX}$ range generated by $T_{EST}$ generated through a hydraulic flow estimate, wherein the pressure switch reading detects fill completion between $T_{MIN}$ and $T_{MAX}$;

FIG. 8 graphically depicts a binary pressure switch reading through a time span, including a comparison to a $T_{MIN}$ to $T_{MAX}$ range generated through a hydraulic flow estimate, wherein the pressure switch reading detects fill completion before $T_{MIN}$; and FIG. 9 graphically depicts a binary pressure switch reading through a time span, including a comparison to a $T_{MIN}$ to $T_{MAX}$ range generated through a hydraulic flow estimate, wherein the pressure switch reading detects fill completion after $T_{MAX}$ or not at all;

FIG. 10 illustrates a process to evaluate forces acting upon a plunger within a PCS in order to evaluate valve position;

FIG. 11 illustrates a process to track clutch fill volume based upon factors indicating a hydraulic oil flow rate; and FIG. 12 illustrates a process to convert clutch flow volume into clutch torque capacity, an estimation of the reactive torque that can be transmitted through the clutch will slip.

DETAILED DESCRIPTION

Figure 1:
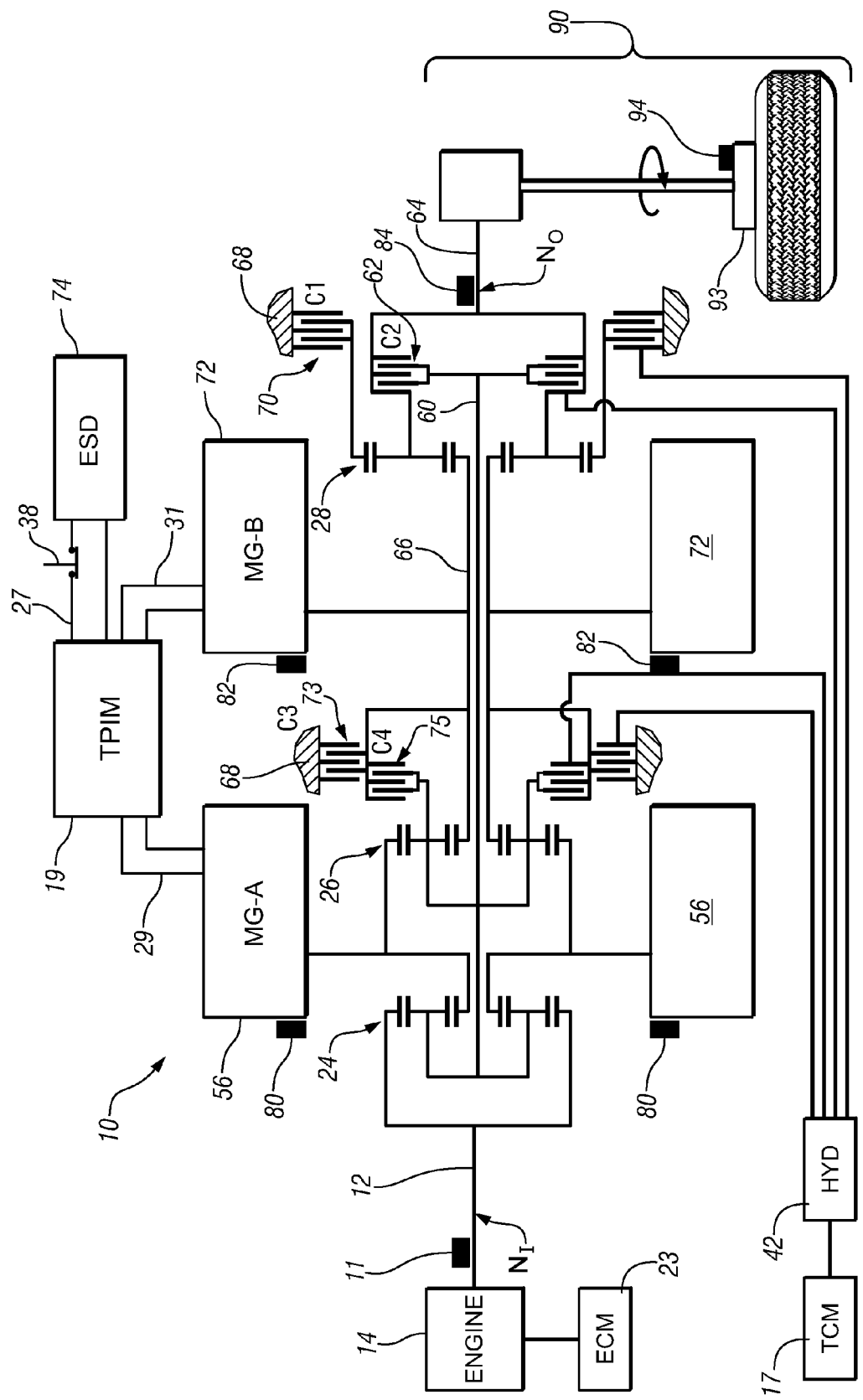
FIG. 1 is a schematic diagram of an exemplary powertrain, in accordance with the present disclosure.
Figure 2:
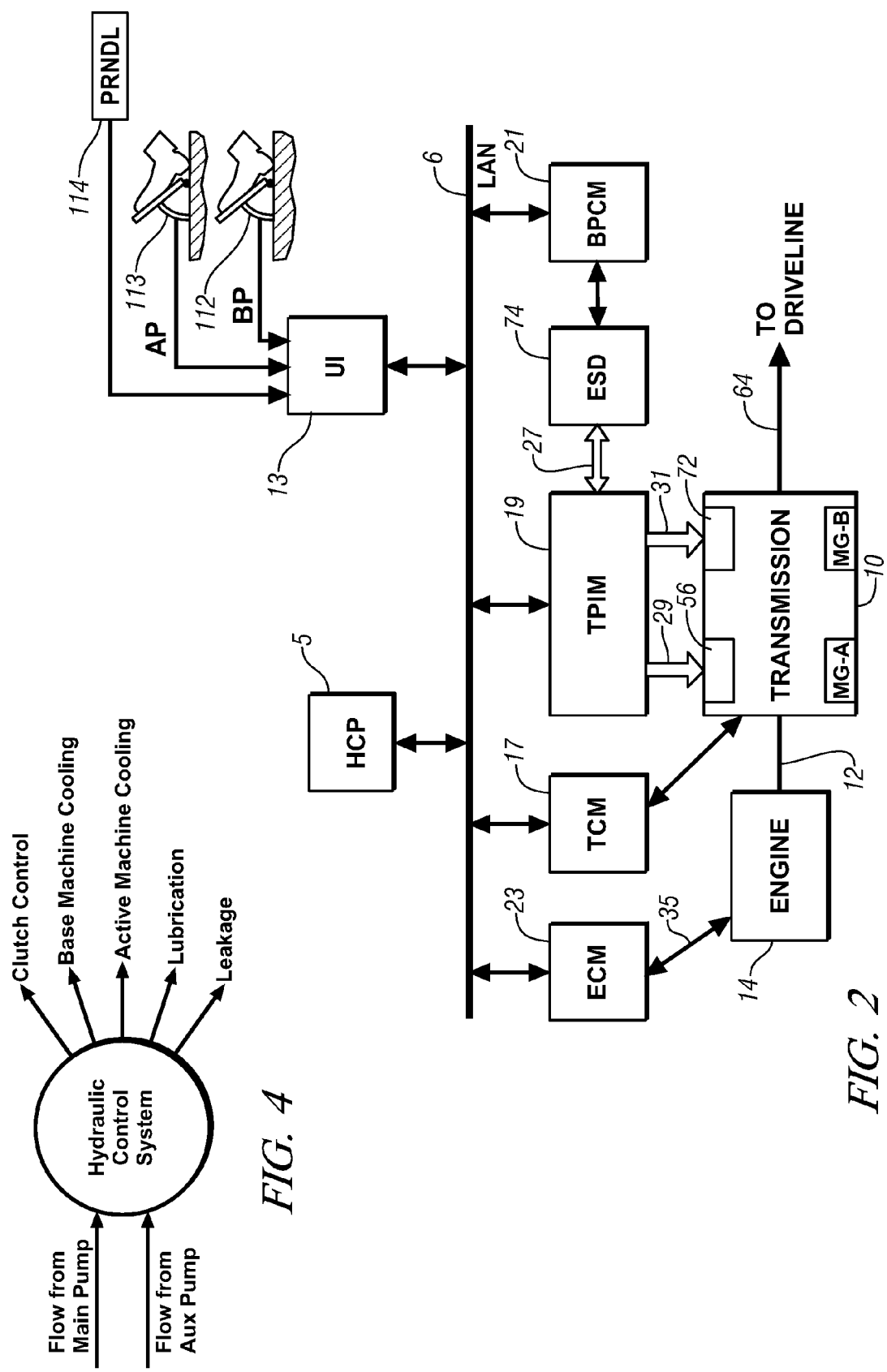
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
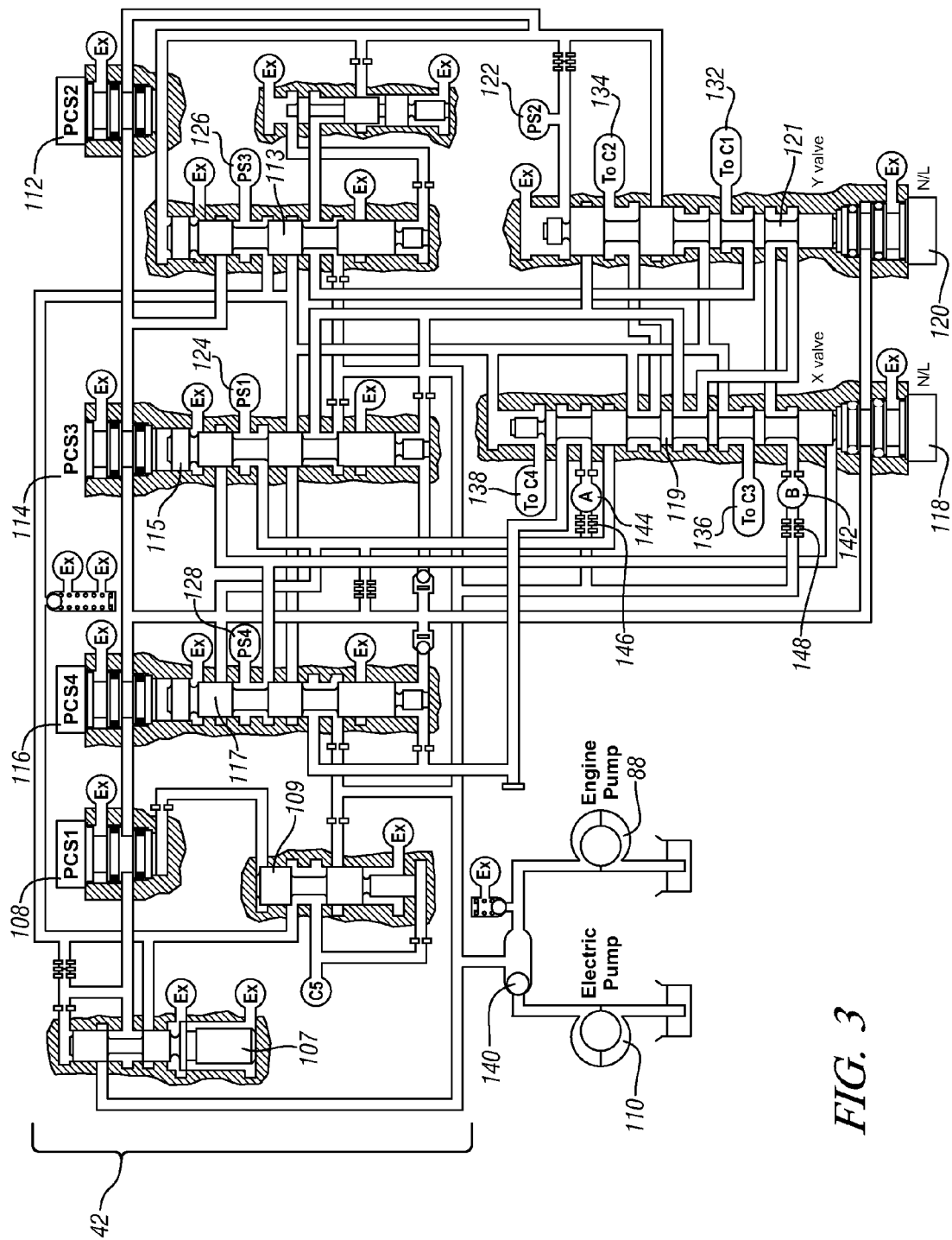
FIG. 3 is a schematic diagram of a hydraulic circuit, in accordance with the present disclosure.

FIG. 3 depicts a schematic diagram of the hydraulic circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic circuit 42 through valve 140. The auxiliary pump 110 preferably comprises an electrically-powered pump of an appropriate size and capacity to provide sufficient flow of pressurized hydraulic oil into the hydraulic circuit 42 when operational. The hydraulic circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic circuit 42 over a range of pressures and may provide additional functionality for the hydraulic circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PSI via passage 122.

The hydraulic circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As described above, operation and control of clutches are important to operating a complex powertrain, such as a hybrid powertrain. Drivability, fuel efficiency, and component life are all impacted by the operation of clutches within the system. Known methods utilizing look-up tables to control clutch activating devices, such as a PCS, are imprecise and inefficient. Modern sensing techniques and computational resources make real-time estimation of parameters within a hydraulic control system possible.

Much can be determined within a hydraulic control system based upon analysis of known variables. FIG. 4 schematically illustrates a model of factors impacting hydraulic flow in an exemplary hydraulic control system, illustrating interdependencies of a number of variables within the system, in accordance with the present disclosure. As one having ordinary skill in the art will appreciate, conservation of mass explains that, in steady state, flow entering a system must equal the flow exiting from that system. As applied to FIG. 4, a flow of hydraulic oil is supplied to the hydraulic control system by the pumps. The flow exits the hydraulic control system through the various functions served by the hydraulic control system. This exemplary embodiment includes the following functions: hydraulic oil fills clutch mechanisms in order to provide clamping force required to lock the clutch, as described above; hydraulic oil provides both base cooling and active cooling of the electric machines and other components as required; hydraulic oil is used to lubricate portions of the transmission; and hydraulic oil flows through leakage internal to the hydraulic circuit. Because the hydraulic control system is a closed system, analysis of the flows entering the system and of the flows exiting the system can calculate an estimated hydraulic line pressure ($P_{LINE\_EST}$) within the system.

As described above, a hydraulic clutch utilizes a hydraulic switch such as a PCS to selectively control the clutch between various states. An exemplary PCS can operate in a number of states. For example, PCS switches can operate in a full feed state, opening a downstream hydraulic circuit to the full pressure of an upstream circuit. PCS switches can operate in an exhaust state, closing off the downstream circuit to the pressure of the upstream circuit and providing a path for pressurized oil to exit the clutch control circuit. PCS switches are also known to operate in an overlap state, providing a partially activated or regulation clutch state. The effect of an overlap state depends upon the design and calibration of PCS. One exemplary use of an overlap state is to enable selection of a touching state in the clutch, as described above.

As is known in the art, hydraulic pressure is related to hydraulic flow rate as a measure of flow resistance. This relationship can be expressed by the following equation.

$$\text{FLOW} = \text{PRESSURE\_DROP}/\text{FLOW\_RESISTANCE} \quad [1]$$

Applied to a hydraulic flow rate in a clutch control circuit, hydraulic flow is a function of the flow resistance of the circuit and the pressure differential across the circuit. For example, with a PCS operating in a full feed state during a clutch fill event, a hydraulic flow originates in the hydraulic control system at $P_{LINE\_EST}$ and flows through a clutch control circuit. Flow resistance of the clutch control circuit can be measured experimentally or estimated analytically. Pressure drop through the clutch control circuit through the process of filling a clutch can be estimated or predicted based upon $P_{LINE\_EST}$ and back pressure resulting within the clutch estimable from the pressure and resulting action upon the piston. Therefore, hydraulic flow rate through the clutch fill event can be modeled based upon known flow resistance values and estimated or predicted pressure values. Similarly, hydraulic flow rate can be modeled when a PCS is operating in an overlap or exhaust state by estimating pressure drops through the path enabled by the PCS state and utilizing known flow resistance values. By utilizing known or estimated pressures within the hydraulic control system and a clutch control circuit in coordination with PCS states, estimates of hydraulic flow rate can be estimated in real-time.

Fill volume of a clutch, the resulting volume of hydraulic oil within a fill volume chamber of the clutch, can be determined as an integration of flow rate into the clutch. This relationship can be expressed as follows.

$$\text{VOLUME} = \int_0^T \text{FLOW\_RATE} * dt \quad [2]$$

By integrating the flow rate through some time span T, a change in the volume of hydraulic oil in the clutch can be estimated. This allows for a running estimation of clutch fill volume through the operation of the powertrain. Estimated fill volume can be calculated based upon the flow rate and a starting estimate of clutch fill volume. A method is disclosed to estimate clutch fill volume based upon a hydraulic flow rate estimate.

Figure 5:
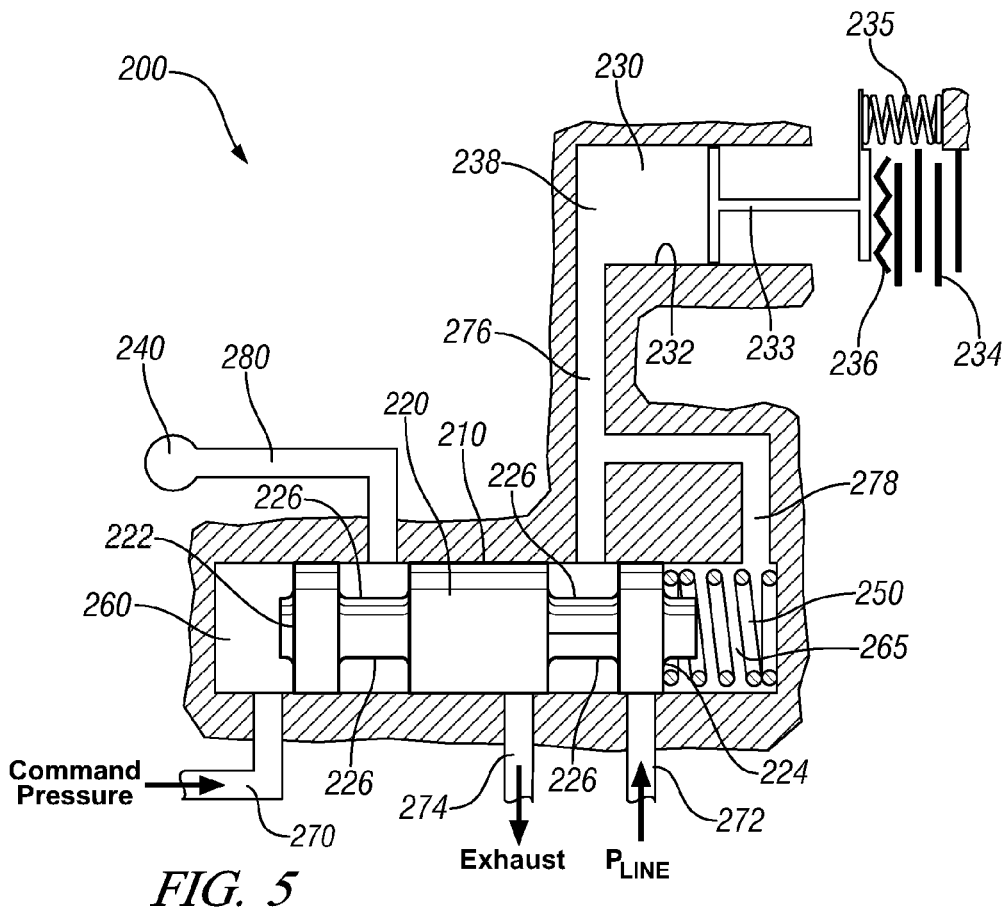
FIG. 5 schematically illustrates an exemplary clutch control circuit utilizing a hydraulically activated pressure control switch, in accordance with the present disclosure.

FIG. 5 schematically illustrates an exemplary clutch control circuit utilizing a hydraulically activated pressure control switch, in accordance with the present disclosure. Clutch control circuit 200 includes PCS 210, hydraulically activated clutch 230, pressure switch 240, and hydraulic lines 270, 272, 274, 276, 278, and 280. PCS 210 selectively controls flow of pressurized hydraulic oil to and from clutch 230 by translation of selecting mechanism within the PCS, in this exemplary embodiment, a spool valve plunger 220. Plunger 220 is selectively acted upon from a first end 222 of the plunger and a second end 224 of the plunger, the balance of forces determining the translative position of the plunger within the PCS. Plunger 220 includes plunger details 226 including holes, grooves, channels, or other features formed on the plunger in order to selectively direct hydraulic oil between various ports connecting hydraulic lines to PCS 210. The position of plunger 220 within PCS 210, corresponding to clutch states described above, selectively align plunger details 226 with hydraulic lines accomplishing the intended clutch function. In the exemplary clutch of FIG. 5, a plunger position to the right corresponds to a full feed state, wherein hydraulic pressure from a main pressure line 272 is channeled through plunger details 226 to clutch feed line 276. Hydraulic oil entering clutch 230 fills clutch volume chamber 238, creates hydraulic pressure within clutch 230, and applies a resulting force upon piston 233. Similarly, a plunger position to the left corresponds to an exhaust state, wherein hydraulic oil within clutch 230 is allowed to escape the clutch and flow through exhaust line 274, entering a hydraulic control system return line (not shown). Selecting the position of plunger 220 is accomplished by modulating a command pressure to a command pressure line 270 feeding a command pressure volume 260 in contact with first end 222. As will be appreciated by one having ordinary skill in the art, force created by pressure on a surface can be determined through the following equation.

$$\text{FORCE=PRESSURE*SURFACE\_AREA\_ACTED\_UPON} \quad [3]$$

In the case of exemplary plunger 220, the force acting upon the plunger from the left equals the hydraulic pressure achieved within command pressure volume 260 times the surface area of first end 222. An increase in pressure within command pressure volume 260 increases the force acting upon plunger 220 from the side of first end 222. A valve return spring 250 applies a force to the second end 224, acting as a restorative force in the opposite direction of the pressure within command pressure volume 260. Force resulting from pressure within volume 260 and force from spring 250 act together such that increased pressure within command pressure volume 260 tends to move plunger 220 in one direction, and reduced pressure within command pressure volume 260 tends to move plunger 220 in the opposite direction. Exemplary PCS 210 includes another feature including a feedback line 278. Hydraulic oil flowing through clutch feed line 276 additionally flows or applies a pressure through feedback line 278. Hydraulic oil from feedback line 278 re-enters PCS 210 within a feedback pressure volume 265 located on the same side of plunger 220 as spring 250. Force resulting upon plunger 220 from hydraulic pressure within feedback pressure volume 265 counteracts force resulting from hydraulic pressure within command pressure volume 260. As a result, wherein a balance of forces resulting from pressure within command pressure volume 260 and spring 250 would cause plunger 220 to be in a position correlating to a full feed state, elevated pressure achieved within clutch feed line 276 associated with a clutch fill event reaching a certain progression creates a force acting upon plunger 220 away from the full feed state position. Calibration and/or control of feedback line 278 and resulting force upon plunger 220 corresponding to a selected pressure within command pressure volume 260 can create a self-correcting plunger position between the opposite ends of plunger travel, enabling an overlap state. Such an overlap state is useful for modulating the pressure achieved within clutch 230, for example, enabling control to a touching state for the clutch. Full feed state can still be achieved despite operation of the feedback line 278 by setting pressure within the command pressure volume 260 to apply a force to plunger 220 exceeding the combination of the force applied by spring 250 and force resulting from hydraulic pressure within feedback pressure volume 265. PCS 210 is known to include pressure switch 240, fed by pressure switch line 280, utilized in known control methods to indicate pressure levels required for control of PCS 210. In this way, PCS 210 can selectively channel hydraulic oil to accomplish multiple states within hydraulically activated clutch 230.

A number of PCS physical configurations are known. One exemplary PCS configuration, as described above, utilizes a cylindrical plunger located in a cylindrical housing. However, a multitude of shapes, configurations, activations methods, and calibration strategies are known in the art, and this disclosure is not intended to be limited to the particular exemplary embodiments described herein.

Figure 6:
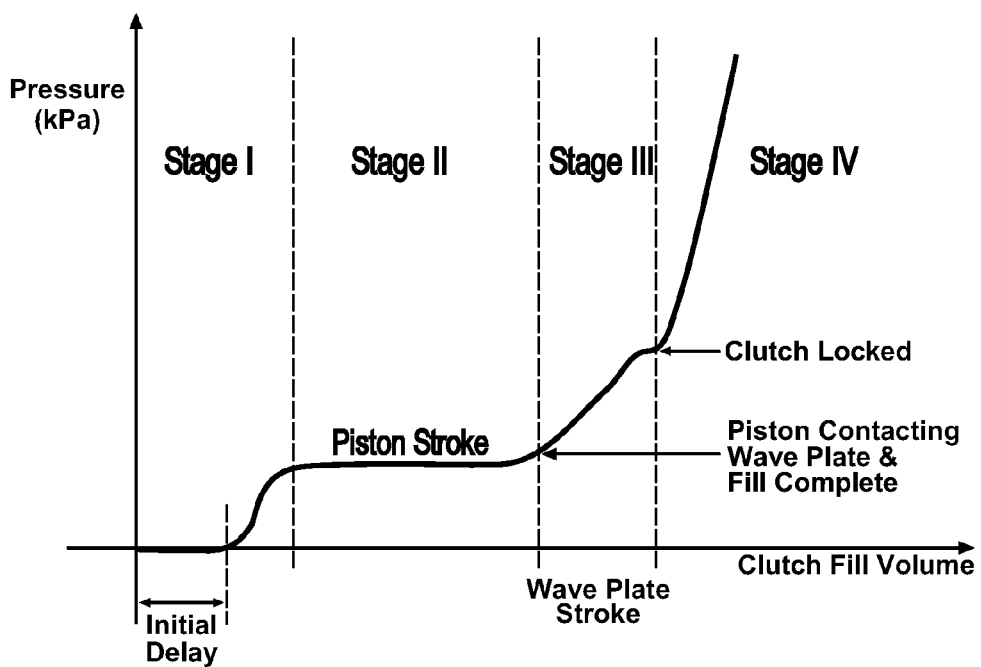
FIG. 6 graphically illustrates an exemplary hydraulic pressure curve associated with a clutch fill event, in accordance with the present disclosure.

FIG. 6 graphically illustrates an exemplary hydraulic pressure curve associated with a clutch fill event, in accordance with the present disclosure. Hydraulic pressure within the clutch volume chamber is depicted as a function of clutch fill volume. The resulting curve is characterized in four stages representing characteristic events in the clutch activation process. The data depicted is representative of an exemplary PCS operating in a full fill state, wherein pressurized hydraulic oil is exposed to the clutch volume, and the oil exerts a force upon a clutch piston, exerting first a force against a return spring and other forces resisting movement of the piston, then exerting force against a wave plate, and then exerting compressive force against the clutch connective surfaces. Stage I depicts a region of clutch fill wherein little back pressure is exerted by the piston upon hydraulic oil in the clutch volume. Such an exemplary curve can represent a portion of the piston stroke beyond the return spring stroke and other forces acting upon the piston providing back pressure upon the piston. Hydraulic pressure quickly ramps up as the piston stroke engages forces acting against movement in the piston in Stage II. Through Stage II, the pressure exerted upon the hydraulic oil remains substantially constant, with additional hydraulic flow filling the clutch volume chamber and displacing the piston through the stroke of the piston. At the end of the piston stroke, the clutch is considered filled and the clutch is said to be in a touching state. However, as described above and as illustrated in wave plate 236 of FIG. 5, a shock absorbing device, such as an exemplary wave plate is frequently used to create a dampening force between the forces being applied in the clutch cylinder and the clutch connective surfaces. As depicted in the data in Stage III of FIG. 6, such a shock absorbing device creates a gradual increase in force upon the clutch connective surfaces for a given increase in clutch fill volume. Once the exemplary wave plate is fully compressed, the clutch is in a locked state. In Stage IV, an increase in clutch fill volume creates a rapid increase in pressure upon the hydraulic oil, and this increase in pressure creates a corresponding undamped compressive force upon the connective surfaces of the clutch.

Figure 7:
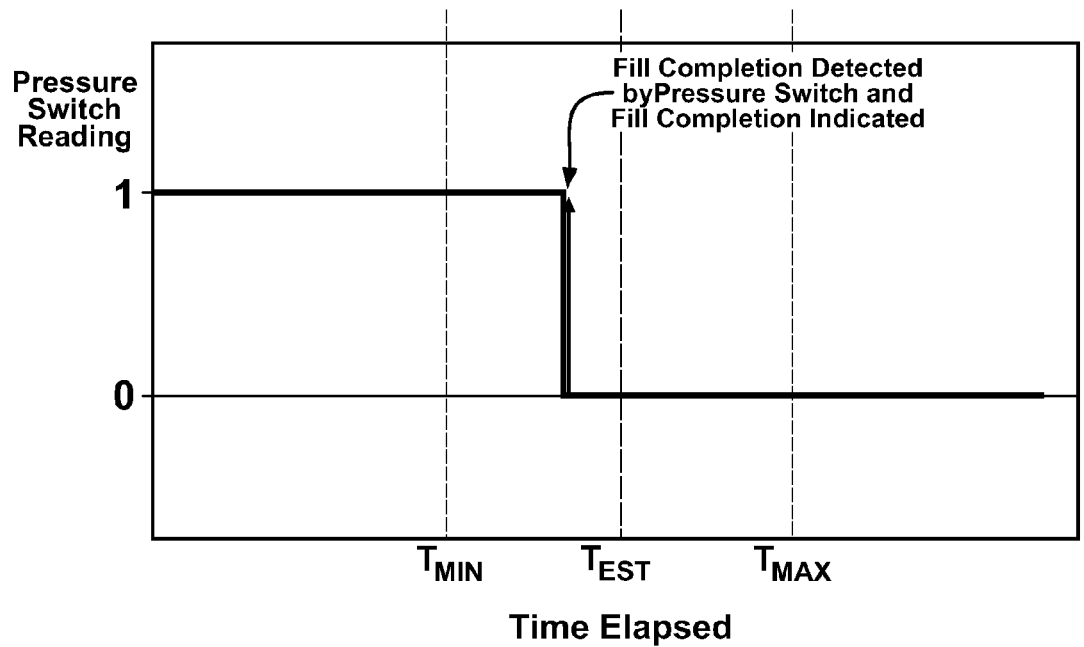
FIGS. 7-9 graphically depict an exemplary method to identify fill completion, utilizing an estimated clutch fill volume based upon an estimated hydraulic flow and additionally utilizing a pressure switch, in accordance with the present disclosure.
Figure 8:
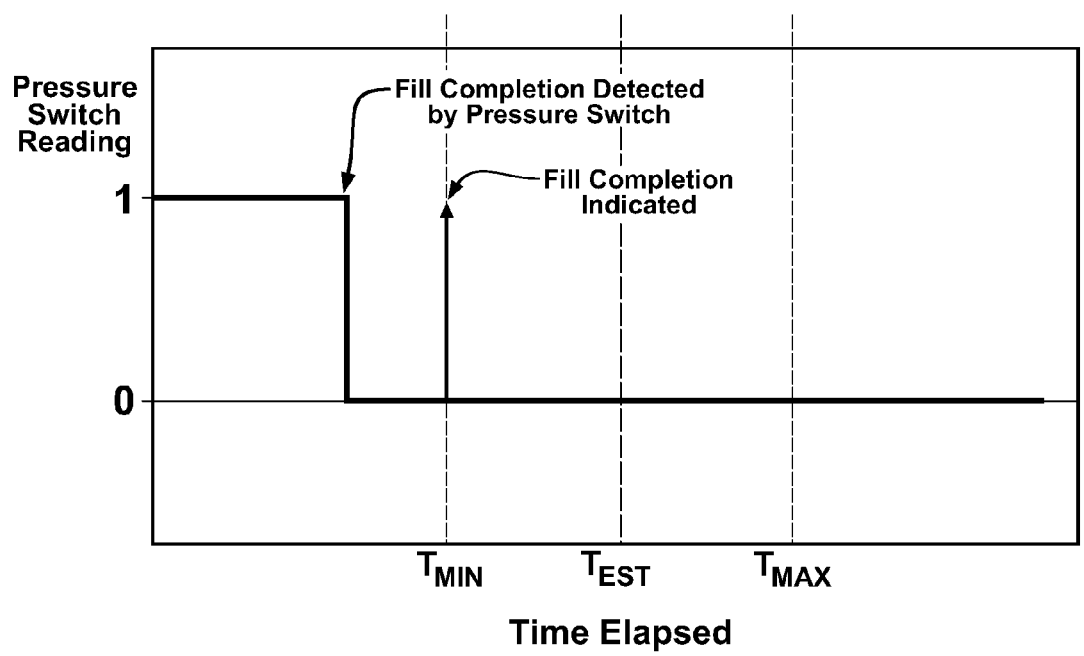
Figure 9:
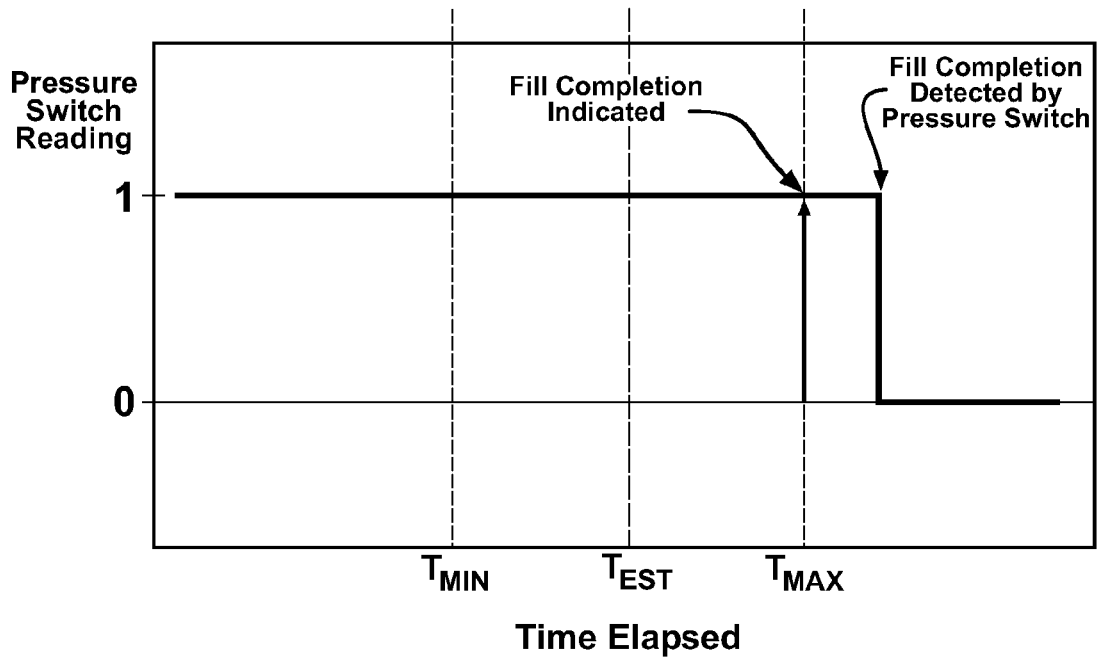

Accurately detecting fill completion, the clutch fill volume wherein the clutch is in a touching state, is important to operation of hydraulically activated clutch. In particular, in applications where clutches are designed for synchronous or no-slip operation, clutch control strategies require coordination of clutch synchronization and application of clamping force before reactive torque is applied, and it will be appreciated that enabling a switch activation to the touching point is useful to such control strategies. As mentioned above, clutch fill volume in combination with an estimated hydraulic flow rate is one method to estimate clutch fill completion. FIGS. 7-9 graphically depict an exemplary method to identify fill completion, utilizing an estimated clutch fill volume based upon an estimated hydraulic flow and additionally utilizing a pressure switch, in accordance with the present disclosure. Utilizing methods described above, a clutch fill volume can be tracked, and based upon an estimated flow rate, an estimated clutch fill time ($T_{EST}$) can be determined. Based upon $T_{EST}$, a range of predicted values between a $T_{MIN}$ and $T_{MAX}$ can be defined, taking into account variances in the clutch fill process and estimation errors, to describe a time span in which fill completion is expected to be achieved. The width of the range created by $T_{MIN}$ and $T_{MAX}$ around $T_{EST}$ and whether the range is symmetric around $T_{EST}$ is a function of the specifics of the clutch fill process and can be set experimentally, empirically, predictively, through modeling or other techniques adequate to accurately hydraulic flow, and a multitude of ranges might be used by the same powertrain for each of several clutches utilized and for different conditions or operating ranges. A pressure switch, calibrated or selected to indicate a hydraulic pressure indicating fill completion, for example increased pressure indicative of the initiation of Stage III of FIG. 6, can be selected to detect fill completion. Based upon these two independent methods to predict fill completion, detection of fill completion can be indicated with increased confidence.

FIG. 7 graphically depicts a binary pressure switch reading through a time span, including a comparison to a $T_{MIN}$ to $T_{MAX}$ range generated by $T_{EST}$ generated through a hydraulic flow estimate, wherein the pressure switch reading detects fill completion between $T_{MIN}$ and $T_{MAX}$. The data depicted in FIG. 7 correlates to a $T_{MIN}$ to $T_{MAX}$ range and a pressure switch confirming fill completion within a similar time span. In this event, the time at which the pressure switch detects fill completion is indicated as fill completion. FIG. 8 graphically depicts a binary pressure switch reading through a time span, including a comparison to a $T_{MIN}$ to $T_{MAX}$ range generated through a hydraulic flow estimate, wherein the pressure switch reading detects fill completion before $T_{MIN}$. The data depicted in FIG. 8 correlates to pressure switch reading falling outside the time span between $T_{MIN}$ and $T_{MAX}$. In this event, $T_{MIN}$, the lower end of the time span predicted by estimated hydraulic flow and closest to the pressure switch detection, is indicated as fill completion. FIG. 9 graphically depicts a binary pressure switch reading through a time span, including a comparison to a $T_{MIN}$ to $T_{MAX}$ range generated through a hydraulic flow estimate, wherein the pressure switch reading detects fill completion after $T_{MAX}$ or not at all. The data depicted in FIG. 9 correlates to pressure switch reading falling outside the time span between $T_{MIN}$ and $T_{MAX}$ or a malfunctioning pressure switch not accurately reflecting the selected hydraulic pressure. In this event, $T_{MAX}$, the upper end of the time span predicted by estimated hydraulic flow and closest to any late pressure switch detection, is indicated as fill completion. In this way, two fill completion detection methods are used in a complementary fashion to indicate fill completion with improved confidence.

The above methods are useful, in any given clutch fill event, to indicate fill completion based upon the comparison of fill completion detection by a pressure switch and fill completion prediction by an estimated hydraulic flow. However, one having ordinary skill in the art will appreciate that a pressure switch is prone to failure or unreliable operation as the pressure switch ages. Clutch operation is known to be relatively consistent, varying by a few variables, such as the temperature of the hydraulic oil, but otherwise remain consistent. Data from the operation of the system, including the fill completion indications, generated as described above, can be tracked over time. In this way, acceptable ranges of fill completion times can be generated and validated for a particular clutch over a period of time. These fill completion times can be used in an algorithm, a model, or a machine learning algorithm to, after some threshold time or phased in gradually, supplement or replace fill completion indication. Various statistical and analytical methods known in the art can be applied to the fill completion data. In this way, fill completion of a clutch can be reliably indicated after components of the system necessary to the above described methods cease to function.

Figure 10:
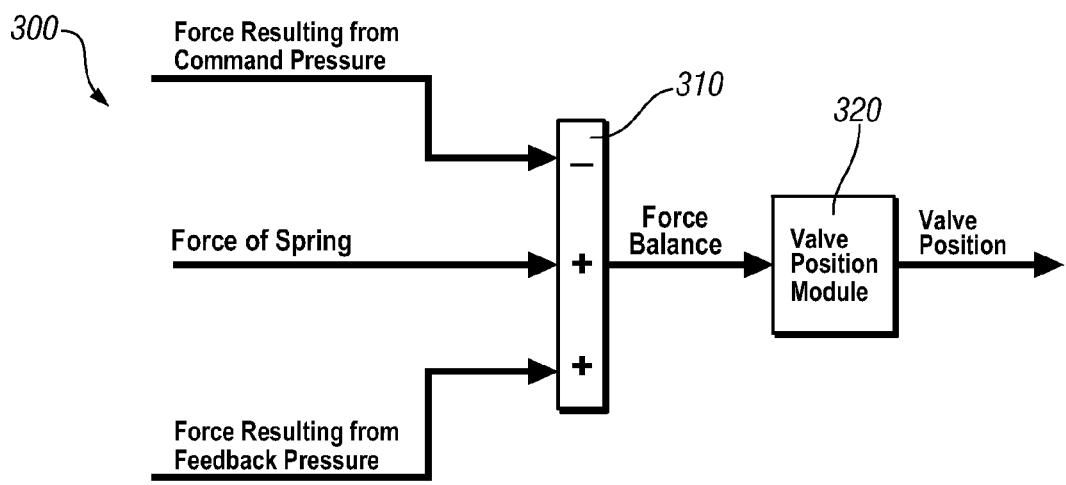
FIGS. 10-12 illustrate an exemplary flow of information analyzing factors including valve positions and line pressure in the hydraulic control system to track clutch fill volume and evaluate clutch torque capacity, in accordance with the present disclosure.
Figure 11:
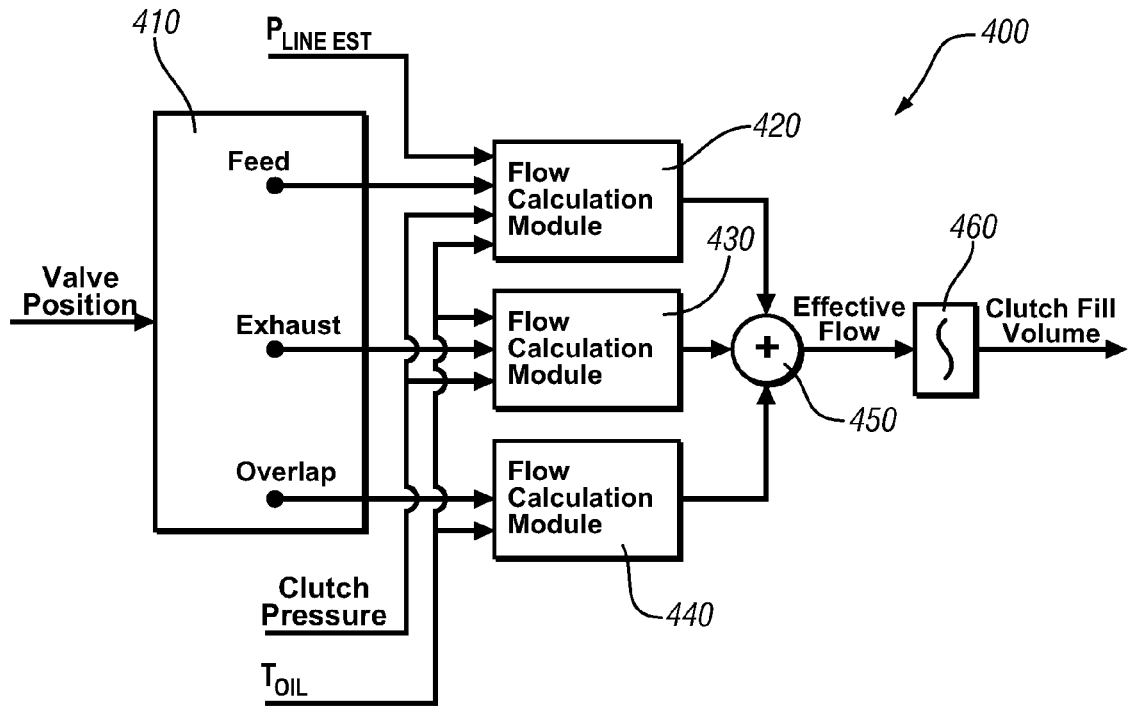
Figure 12:
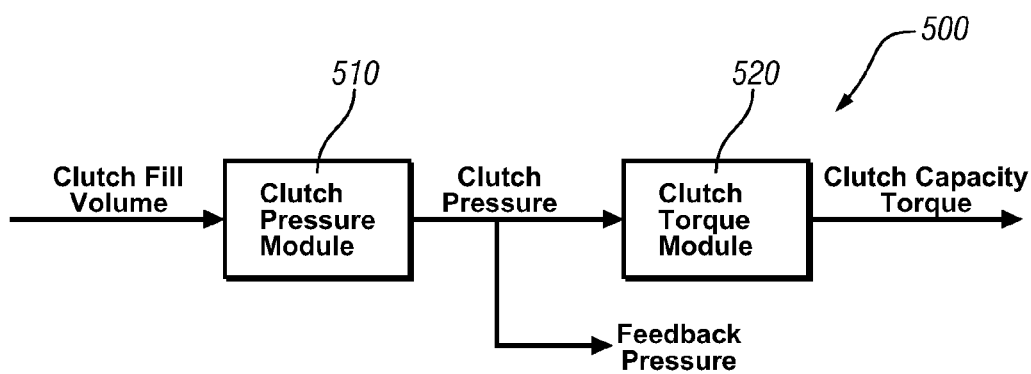

As described above, a method is disclosed for tracking clutch fill volume on the basis of an estimated hydraulic oil flow for use in clutch control. Various calculations and estimations are required to enable calculations required to make this tracking of clutch fill volume. FIGS. 10-12 illustrate an exemplary flow of information analyzing factors including valve positions and line pressure in the hydraulic control system to track clutch fill volume and evaluate clutch torque capacity, in accordance with the present disclosure. FIG. 10 illustrates a process to evaluate forces acting upon a plunger within a PCS in order to evaluate valve position. Process 300 includes a summation block 310, summing various forces acting upon an exemplary PCS plunger and outputting a force balance term to a valve position module 320, estimating the position of the plunger within the PCS device. Inputs to the summation block 310 include a force resulting from a command pressure utilized to positively drive the plunger into one state, a force of a return spring acting against the force from the command pressure, and a force resulting from a feedback pressure loop. The command pressure and the feedback pressure can be calculated by methods described herein or methods well known in the art and will frequently be functions of $P_{LINE\ EST}$. The force of the return spring is a function of plunger or valve position and the resulting displacement of the spring. Force of the spring can be estimated by many methods. Valve position module 320 translates the force balance term into a valve position term for use in estimating the operation of the hydraulic lines and circuits attached to the PCS. FIG. 11 illustrates a process to track clutch fill volume based upon factors indicating a hydraulic oil flow rate. Process 400 includes a PCS state module 410, a full feed flow calculation module 420, an exhaust flow calculation module 430, an overlap flow calculation module 440, a summation block 450, and an integration block 460. PCS state module 410 inputs a valve position term, indicating the state of a valve within an exemplary PCS, and determines the PCS state resulting from the indicated valve position. The exemplary PCS state module reflects three discreet PCS states that can be indicated. However, one having ordinary skill in the art will appreciate that valves can have two or more than three discreet states, and valve can operate with some variable orifice, for example, reflecting a certain percentage of maximum flow. The method of this disclosure can work with any of these embodiments and is not intended to be limited to the particular embodiment of FIG. 11. PCS state module 410 outputs an indication of the resulting state of the PCS valve for use in hydraulic flow estimation. Because the embodiment of FIG. 11 includes three discreet PCS states, individual flow calculation modules 420, 430, and 440 can be utilized to calculate hydraulic flow based upon the indicated PCS state. In addition to valve setting, each flow calculation module inputs information relevant to flow estimation, as indicated in FIG. 11, including $P_{LINE\ EST}$, clutch pressure, and $T_{OIL}$. However, it will be appreciated that flow can be calculated in a number of ways and by a single module or a plurality of modules. Additionally, changing mode settings, for example self-adjusting valve position based upon the feedback loop described in the exemplary embodiment of FIG. 5, can cause rapid oscillations and transient operation. Summation block 450 is effective to add transient and partial flows resulting from changing valve position. As described above, flow can be integrated over some time span and, in combination with a pre-existing or estimated starting fill volume, can be used to estimate clutch fill volume. In this way, integration block 460 inputs variables and estimates a clutch fill volume. FIG. 12 illustrates a process to convert clutch flow volume into clutch torque capacity, an estimation of the torque that can be transmitted through the clutch without the clutch slipping. Clutch torque capacity can be used in a number of ways to accurately control clutches within the transmission, and in particular, to accomplish synchronous clutch shifts in accordance with the disclosure. Process 500 includes a clutch pressure module 510 and a clutch torque module 520. As demonstrated by FIG. 6, clutch fill volume can have a direct or functional relationship to clutch pressure. Clutch pressure module inputs clutch fill volume and estimates clutch pressure. In this exemplary embodiment, feedback pressure for use within a feedback loop of a PCS switch is equated to clutch pressure. However, as described above, feedback loops are known to calibrate or control feedback pressure, and in such a system, FIG. 12 would include a module to convert clutch pressure to feedback pressure. Clutch torque module 520 inputs clutch pressure, the pressure within the clutch volume chamber, and estimates the clutch torque capacity. Through processes 300, 400, and 500 or functional equivalents, inputs relating to the operation of a PCS switch can be used to determine the operation and resulting torque capacity of a controlled clutch.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a powertrain comprising an electro-mechanical transmission mechanically-operatively coupled to an internal combustion engine and an electric machine configured to selectively transmit mechanical power to an output member through selective application of a plurality of hydraulically actuated clutches, the method comprising:
    in response to a command to activate one of said clutches,
        monitoring a state of a pressure control switch operatively coupled to the clutch;
        operating the pressure control switch in one of a full feed state and an overlap state and monitoring a hydraulic line pressure utilized by said pressure control switch to fill said clutch;
        determining a hydraulic flow rate flowing to said clutch based upon said state of said pressure control switch and said hydraulic line pressure;
        tracking a clutch fill volume of said clutch based upon said hydraulic flow rate;
        estimating a clutch fill completion time based upon said clutch fill volume and said hydraulic flow rate and a time span wherein achieving clutch fill completion is expected based upon said clutch fill completion time;
        monitoring an output of a pressure switch operatively coupled to said clutch and detecting a fill completion based upon achievement of a clutch pressure calibrated to expected clutch fill completion independent of said estimating of the clutch fill completion time based upon said clutch fill volume and said hydraulic flow rate;
        indicating the clutch fill completion indicating said clutch is in a touching state,
            wherein indicating said clutch fill completion comprises:
                comparing said time span wherein achieving clutch fill completion is expected and said fill completion detected by said pressure switch;
                determining whether the fill completion detected by said pressure switch occurred at a time that coincides with said time span wherein achieving clutch fill completion is expected; and
                indicating said clutch fill completion based upon said comparing and said determining.

2. The method of claim 1, wherein indicating said clutch fill completion based upon said comparing and said determining comprises:
    if said monitoring of said output of said pressure switch indicates said achievement of said calibrated clutch pressure before said time span, indicating said clutch fill completion at a beginning of said time span;
    if said monitoring of said output of said pressure switch indicates said achievement of said calibrated clutch pressure after said time span, indicating said clutch fill completion at an end of said time span;
    if said monitoring of said output of said pressure switch does not indicate said achievement of said calibrated clutch pressure in a time proximate to said time span, indicating said clutch fill completion at an end of said time span; and
    if said monitoring of said output of said pressure switch indicates said achievement of said calibrated clutch pressure during said time span, indicating said clutch fill completion coincident to said output of said pressure switch.

3. The method of claim 1, further comprising:
    indicating said clutch fill completion based on said comparing over a plurality of clutch fill cycles;
    determining an average clutch fill completion indication time; and
    utilizing said average clutch fill completion indication time to control operation of said clutch.

4. The method of claim 1, wherein monitoring said state of said pressure control switch operatively coupled to one of said clutches comprises:
    monitoring forces acting upon a selecting mechanism within said pressure control switch; and
    indicating said state of said pressure control switch based upon said monitoring of said forces.

5. Method for operating a powertrain comprising an electro-mechanical transmission adapted to selectively transmit mechanical power to an output member through selective application of a hydraulically actuated clutch, the method comprising:
    in response to a command to activate said clutch,
        operating a pressure control switch in one of a full feed state and an overlap state and monitoring factors affecting a hydraulic flow through a clutch control circuit associated with said clutch;
        determining said hydraulic flow through said clutch control circuit based upon said factors;
        tracking a clutch fill volume of said clutch through integration of said hydraulic flow and estimation of an initial clutch fill volume;
        estimating a clutch fill completion time based upon said clutch fill volume and said hydraulic flow rate;
        estimating a time span wherein achieving clutch fill completion is expected based upon said clutch fill completion time;
        wherein monitoring said factors affecting hydraulic flow comprises:

monitoring a state of the pressure control switch controlling said hydraulic flow, wherein said state indicates flow paths currently selected for said clutch control circuit;

monitoring a clutch control circuit hydraulic flow resistance based upon said state of said pressure control switch;

monitoring a hydraulic line pressure available to actuate said clutch; and estimating a pressure drop through said clutch control circuit based upon said state of said pressure control switch, said estimated hydraulic line pressure, an estimated clutch pressure, and a pressure of a hydraulic return line; and indicating a clutch fill completion indicating said clutch is in a touching state; wherein indicating said clutch fill completion comprises:

monitoring an output of a pressure switch operatively coupled to said clutch and detecting a fill completion based upon achievement of a clutch pressure calibrated to expected clutch fill completion independent of said estimating of the clutch fill volume and said hydraulic flow rate;

comparing said time span wherein achieving clutch fill completion is expected and said fill completion detected by said pressure switch;

determining whether the fill completion detected by the pressure switch occurred at a time that coincides with said time span wherein achieving clutch fill completion is expected; and indicating said clutch fill completion based upon said comparing and determining.

6. The method of claim 5, wherein indicating said clutch fill completion based upon said comparing and determining comprises:

if said monitoring of said output of said pressure switch indicates said achievement of said calibrated clutch pressure before said time span, indicating said clutch fill completion at a beginning of said time span;

if said monitoring of said output of said pressure switch indicates said achievement of said calibrated clutch pressure after said time span, indicating said clutch fill completion at an end of said time span;

if said monitoring of said output of said pressure switch does not indicate said achievement of said calibrated clutch pressure in a time proximate to said time span, indicating said clutch fill completion at an end of said time span; and if said monitoring of said output of said pressure switch indicates said achievement of said calibrated clutch pressure during said time span, indicating said clutch fill completion coincident to said output of said pressure switch.

7. The method of claim 5, further comprising:

indicating said clutch fill completion based on said comparing over a plurality of clutch fill cycles;

determining an average clutch fill completion indication time; and utilizing said average clutch fill completion indication time to control operation of said clutch.

8. The method of claim 5, wherein said monitoring said state of the pressure control switch controlling said hydraulic flow comprises:

monitoring forces acting upon a selecting mechanism within said pressure control switch; and indicating said state of said pressure control switch based upon said monitoring of said forces.

\* \* \* \* \*